United States Patent [19]

Howell

[11] 3,745,828

[45] July 17, 1973

[54] TEMPERATURE-SENSING DEVICE FOR CONTINUOUS-CASTING MOLDS

[75] Inventor: William E. Howell, Monroeville Borough, Pa.

[73] Assignee: United States Steel Corporation, Pittsburgh, Pa.

[22] Filed: Feb. 9, 1972

[21] Appl. No.: 224,863

[52] U.S. Cl.................. 73/295, 73/359, 164/154
[51] Int. Cl..................... G01f 23/22, G01k 7/08
[58] Field of Search.................... 73/295, 343, 349; 164/4, 154

[56] References Cited
UNITED STATES PATENTS

| | | | |
|---|---|---|---|
| 3,681,990 | 8/1972 | Barrett | 73/343 R |
| 2,450,871 | 10/1948 | Adair | 73/359 |
| 3,204,460 | 9/1965 | Milnes | 73/295 |
| 3,581,568 | 6/1971 | Pfefer | 73/343 R |
| 3,526,134 | 9/1970 | Paine | 73/343 R |
| 3,456,715 | 7/1969 | Freedman | 164/4 |

*Primary Examiner*—Donald O. Woodiel
*Attorney*—Walter P. Wood

[57] ABSTRACT

An improved temperature-sensing device for use in a mechanism which locates the level of liquid in a continuous casting mold. The device includes probes which are spring-urged into contact with the inner wall of the mold, as shown in an earlier application. The features of improvement are (1) that the springs are encased out of contact with the cooling water, whereby sediment in the water cannot jam them, and (2) the points on the probes are covered with a sealant, whereby impurities in the water do not precipitate on them.

5 Claims, 2 Drawing Figures

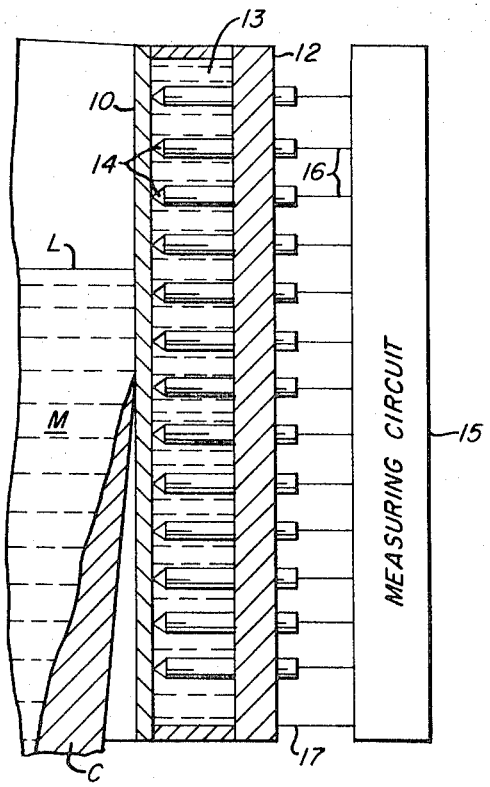
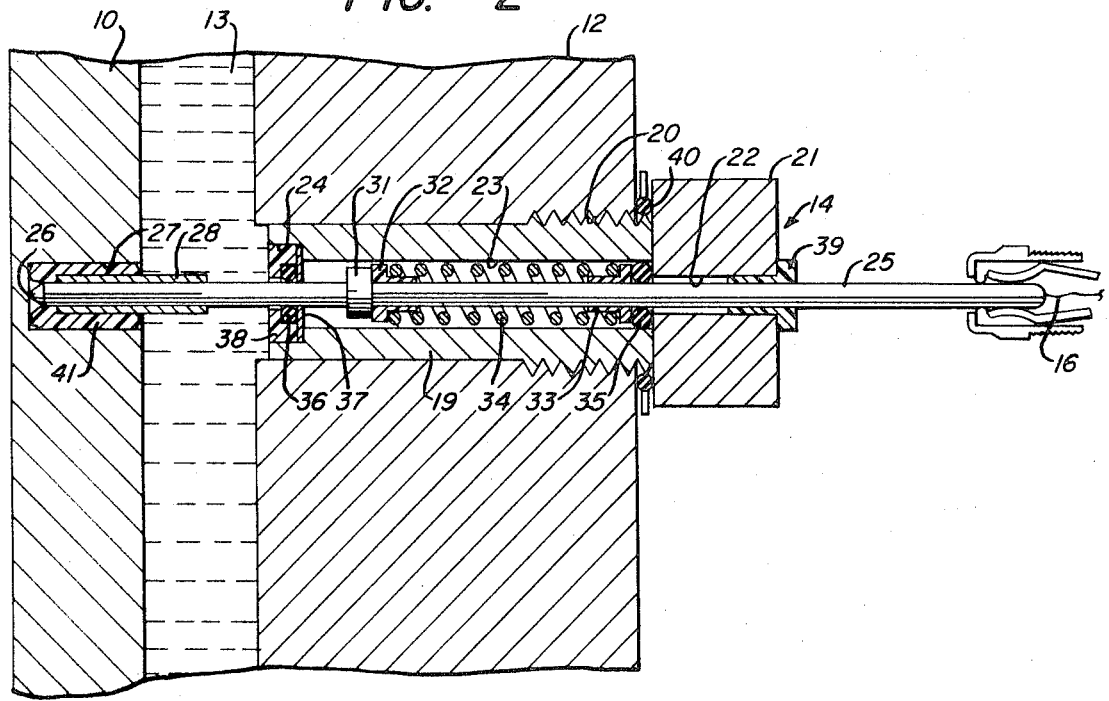

TEMPERATURE-SENSING DEVICE FOR CONTINUOUS-CASTING MOLDS

This invention relates to an improved temperature-sensing device especially for use in an indicator which locates the liquid level in a continuous-casting mold.

The invention is an improvement over the temperature-sensing device shown in Babcock and Wilson application Ser. No. 88,780, filed Nov. 12, 1970, now abandoned, which in turn is an improvement over the device shown in Milnes U.S. Pat. No. 3,204,460, all of common ownership.

A conventional continuous-casting mold has spaced-apart inner and outer walls. Liquid metal is poured continuously through an open-ended mold cavity formed within the inner wall. The space between walls forms a passage through which water circulates to cool the inner wall and solidify an outer skin on the casting before it leaves the lower end of the mold cavity.

The Milnes patent shows a continuous-casting mold equipped with a mechanism for indicating the level of liquid metal in the mold. The mechanism includes a row of vertically spaced thermocouples mounted in the inner wall of the mold and a measuring circuit to which the thermocouples are connected for indicating the temperature at each thermocouple and thus showing the temperature profile along the height of the mold. The mold wall is cooler above the level of liquid than immediately below. Hence the height at which the profile shows an abrupt temperature change locates the level of liquid in the mold. Desirably this level is maintained constant. An indication of the location of this level enables proper control to be exercised.

The Milnes mechanism utilizes conventional thermocouples which furnish accurate temperature measurements, but which are awkward to install in a water-cooled mold. To prevent erroneous temperature indications, the thermocouple junctions are embedded in the inner wall of the mold and are insulated from external cooling of the water which circulates through the passage between the mold walls. The leads from the junctions must be completely electrically insulated. The Babcock and Wilson application shows an improvement which overcomes this difficulty. The thermocouples are replaced with probes which only must be of a different metal than the inner wall. The ends of the probes have points which contact the inner wall and in effect form thermocouples therewith. The probes are exposed directly to the circulating water. The probes do not furnish a measurement of the true temperature of the mold wall, but only of the relative temperature, which is all that is needed to locate the liquid level.

The Babcock and Wilson mechanism includes springs which urge the probes into contact with the inner wall of the mold as the parts undergo thermal expansion and contraction. The water available in steel mills for cooling the mold often contains sediment which may clog or jam the springs. Another problem is that various impurities in the water, for example calcium salts, may precipitate on the probes and prevent proper electrical contact with the inner wall.

An object of the present invention is to provide an improved temperature-sensing device which overcomes the foregoing problems, that is, in which probes are used but are not subject to having their springs jam or having deposits form on their points.

A further object is to provide a water-cooled continuous-casting mold equipped with spring-pressed temperature-sensing probes in which the springs are fully encased and not subject to jamming by reason of sediment in the cooling water.

A further object is to provide a temperature-sensing device in which the probe is protected against impurities in the water precipitating on its point.

In the drawing:

FIG. 1 is a diagrammatic vertical sectional view of a continuous-casting mold equipped with temperature-sensing devices in accordance with my invention.

FIG. 2 is a vertical sectional view through the two walls of a continuous-casting mold showing details of one of my temperature-sensing devices.

FIG. 1 shows a portion of a conventional continuous-casting mold which includes spaced-apart inner and outer walls 10 and 12. The inner wall 10 is of a metal which has high thermal conductivity, usually copper. The outer wall 12 usually is steel. The inner wall contains liquid metal M which rises to a level L and which partially solidifies in the lower portion, as indicated at C. The space between walls 10 and 12 forms a passage 13 through which water circulates to cool the inner wall and assist in solidifying the casting, as known in the art. The mold is equipped with a row of vertically spaced temperature-sensing devices 14 constructed in accordance with my invention and hereinafter described. A measuring circuit 15 is electrically connected to these devices through leads 16 and to the mold through a lead 17. The circuit is shown only in block diagram, since it may be the same as shown in detail in the Milnes patent.

FIG. 2 shows details of one of my temperature-sensing devices 14. Preferably the others are similar. The device includes a tubular housing 19, preferably metal, threadedly engaged with a tapped opening 20 in the outer wall 12 of the mold. The outer end of the housing has an integral nut 21. The housing has a bore 22 and first and second counterbores 23 and 24. An elongated probe 25 extends through the bore and counterbores and at its inner end has a point 26 which contacts the surface of the inner wall 10 within a well 27 in the inner wall. Preferably I place an insulating sleeve 28 around the probe in the vicinity of the well to prevent any more than single point contact between the probe and inner wall. The probe is of a metal dissimilar to the metal of the inner wall. For example, if the inner wall is copper, the probe may be of the nickel-copper alloy constantan. Other examples of metals suitable for use with a copper inner wall are iron, steel, alloys such as "Alumel," and platinum. The only requirement is that the two metals (wall and probe) form a thermocouple capable of transmitting a measurable voltage signal at the temperatures encountered. Conveniently the probe has a diameter of about ⅛ inch to furnish the necessary mechanical strength, yet not unduly obstruct the water passage 13. Aside from the specific construction of the housing 19, the parts thus far described are similar to those shown in the Babcock and Wilson application.

In accordance with my invention, the probe 25 carries a fixed collar 31 and a pair of spaced-apart slidable flanged bushings 32 and 33 all within the first counterbore 23. A compression spring 34 within the counterbore 23 encircles the probe and bears at its end against the respective flanged bushings. The probe extends through O-ring seals 35 and 36 located at the bottoms of the counterbores 23 and 24 respectively. The O-ring 36 is fixed between a washer 37 and retainer 38 fitted within the counterbore 24. The probe extends through another bushing 39 located at the outer end of the bore 22. The probe is electrically insulated from the outer wall 12. If the housing 19 is steel or other metal, the flanged bushings 32 and 33, washer 37, retainer 38 and bushing 39 are of insulating material. Preferably I include another O-ring seal 40 between nut 21 and the outer wall 12.

The compression spring 34 acts against the flanged bushing 32 and collar 31 to urge the point 26 into engagement with the inner wall 10 as the parts undergo thermal expansion and contraction. A portion of the probe 25 is exposed to water which circulates through passage 13, but the spring is fully encased within the counterbore 23. The O-ring seal 36 prevents the circulating water from reaching the spring and possibly jamming it with sediment.

Preferably I fill the well 27 with a body 41 of a grease-like sealant which prevents impurities in the water from precipitating on the probe 25 in the vicinity of its point 26. The sealant should be flexible, electrically insulating, easily installed or removed, unaffected by the temperatures encountered, and water-insoluble. It should not exceed about 350mm penetration, as determined by ASTM D–217, and it should have a minimum dropping point of 250° F as determined by ASTM D–566. Examples of suitable sealants are various known silicone materials. Two that I have used successfully are available commercially from Dow-Corning Corporation, Midland, Michigan, as "Dow Corning No. 340 Silicone Heat Sink Compound" and "Dow Corning No. 5."

From the foregoing description it is seen that my invention affords a temperature-sensing device which fully overcomes the problems encountered when a probe-type sensor is used with sediment-laden impure water, commonly used in a steel mill. The device also can be used with clean water or in a dry environment, in which event not all the seals shown are required.

I claim:

1. In a combination which includes a continuous-casting mold adapted to contain liquid metal and a mechanism for indicating the level of the liquid metal therein;

said mold including spaced-apart inner and outer walls, said inner wall containing the liquid metal and being itself of a metal which has a high thermal conductivity, the space between said walls forming a passage through which cooling water circulates to cool said inner wall;

said mechanism including a row of vertically spaced temperature-sensing devices on said mold and a measuring circuit connected to said devices for indicating the level at which there is an abrupt change in the temperature of said inner wall;

each of said devices comprising a respective probe having a point at one end and being of a metal dissimilar to the metal of said inner wall, a respective tubular housing mounted in said outer wall, said probe being electrically insulated from said outer wall and extending through said housing and across said passage where it is exposed to water circulating therethrough, and a spring urging said probe to a position in which said point contacts said inner wall, the improvement in which:

said housing has a counterbore through which said probe extends, said spring is located within said counterbore, and sealing means between the surfaces of said probe and said counterbore prevents water in said passage from reaching said spring.

2. An improvement as defined in claim 1 in which said probe carries bushings located within said counterbore, said spring encircles said probe between said bushings, and said sealing means are in the form of O-rings mounted at opposite ends of said counterbore.

3. An improvement as defined in claim 1 in which said inner wall has a well receiving said point, and including a body of sealant within said well covering said point.

4. In a combination which includes a continuous-casting mold adapted to contain liquid metal and a mechanism for indicating the level of the liquid metal therein;

said mold including spaced-apart inner and outer walls, said inner wall containing the liquid metal and being itself of a metal which has a high thermal conductivity, the space between said walls forming a passage through which cooling water circulates to cool said inner wall;

said mechanism including a row of vertically spaced temperature-sensing devices on said mold and a measuring circuit connected to said devices for indicating the level at which there is an abrupt change in the temperature of said inner wall;

each of said devices comprising a respective probe having a point at one end and being of a metal dissimilar to the metal of said inner wall, a respective tubular housing mounted in said outer wall, said probe being electrically insulated from said outer wall and extending through said housing and across said passage where it is exposed to water circulating therethrough, and a spring urging said probe to a position in which said point contacts said inner wall;

the improvement in which:

said inner wall has a well receiving said point, and a body of sealant within said well covers said point.

5. An improvement as defined in claim 4 in which said spring is encased out of contact with water circulating in said passage.

* * * * *

UNITED STATES PATENT OFFICE
CERTIFICATE OF CORRECTION

Patent No. 3,745,828                    Dated July 17, 1973

Inventor(s) WILLIAM E. HOWELL

It is certified that error appears in the above-identified patent and that said Letters Patent are hereby corrected as shown below:

Column 1, line 11, after "ownership.", insert -- The subject matter of abandoned application Serial No. 88,780 is covered in an application which is a continuation, thereof, Serial No. 230,048, filed February 28, 1972. -- .

Signed and sealed this 25th day of December 1973.

(SEAL)
Attest:

EDWARD M. FLETCHER, JR.
Attesting Officer

RENE D. TEGTMEYER
Acting Commissioner of Patents